(12) United States Patent
Hybertson

(10) Patent No.: US 6,186,138 B1
(45) Date of Patent: Feb. 13, 2001

(54) RECYCLING AIR MIXER FOR HEATER UNIT

(76) Inventor: Verlyn Hybertson, P.O. Box 249, Centerville, SD (US) 57104

( * ) Notice: Under 35 U.S.C. 154(b), the term of this patent shall be extended for 0 days.

(21) Appl. No.: 09/394,247

(22) Filed: Sep. 13, 1999

(51) Int. Cl.[7] ........................................ F24C 9/00
(52) U.S. Cl. .................. 126/247; 126/110 A; 126/110 B
(58) Field of Search ..................... 126/247, 110 R, 126/11 B, 110 C, 99 D, 110 D, 99 R, 116 R, 109; 432/219, 222

(56) References Cited

U.S. PATENT DOCUMENTS

| | | | |
|---|---|---|---|
| 2,001,531 | * 5/1935 | Hall | 126/110 A |
| 3,025,407 | * 3/1962 | Robson | 126/110 B |
| 3,245,399 | * 4/1966 | Lawson | 126/247 |
| 3,977,387 | * 8/1976 | Lawler | 126/247 |
| 4,462,386 | * 7/1984 | Powell | 126/247 |
| 4,596,077 | * 6/1986 | Kuboyama et al. | 126/247 |
| 5,819,724 | * 10/1998 | Hybertson | 126/247 |

\* cited by examiner

Primary Examiner—James C. Yeung

(57) ABSTRACT

A portable controlled heating unit providing for recirculating heated air to obtain better control of exit temperature from a heating unit. Temperature sensors of exit temperature control vaned entrances and exits under one single unit to control the recirculation.

10 Claims, 2 Drawing Sheets

RECYCLING AIR MIXER FOR HEATER UNIT

BACKGROUND AND SUMMARY OF THE INVENTION

This invention pertains to portable devices for providing heated air to any particular desired point. In many instances such devices may use a heat producer such as that of applicant's U.S. Pat. No. 5,819,724, issued Oct. 13, 1998, but they may also be used where the heat is produced by some other type of heater. Usually the transmission of heat is a heated oil or similar fluid. Ordinarily the heater is driven by an engine and is enclosed in a housing having an inlet and a directed outlet.

Particularly in very cold climates where the ambient air is drawn into the heat exchanges, there may be times when the air is not adequately heated for use in heating the desired area or where the heated air needs to be better controlled.

In order to do that added heating or to get improved control, this invention proposes a fairly simple recirculating device. Controls are necessary and provide for the appropriate outlet temperatures and amounts of flow.

DESCRIPTION

Figure 2:
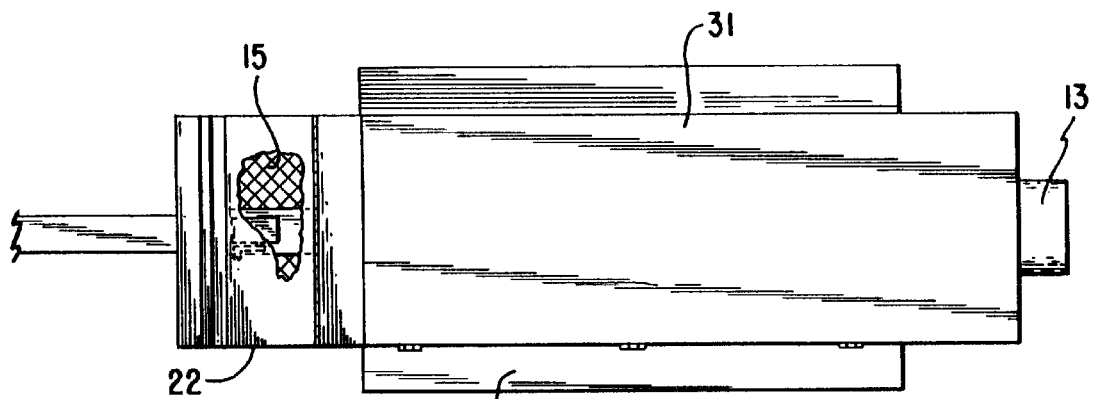
FIG. 2 is a top plan view of the unit of FIG. 1 with parts being broken away to show underlying parts.
Figure 1:
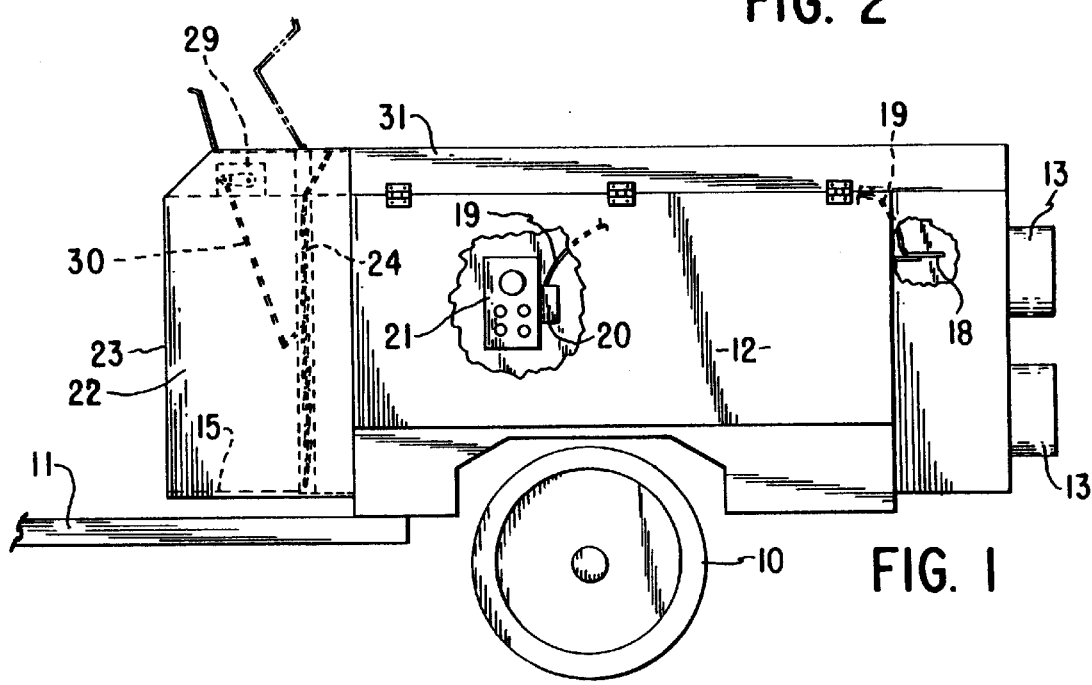
FIG. 1 is a side elevational view of the portable recirculating unit.
Figure 3:
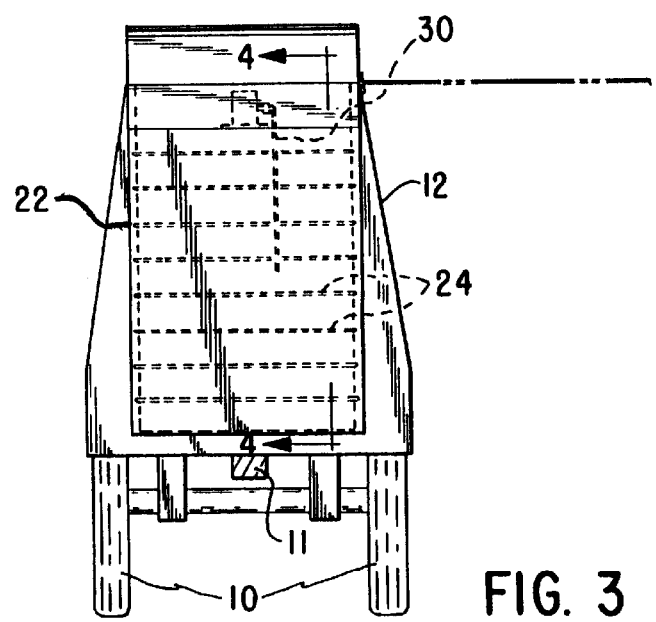
FIG. 3 is an end elevational view of the unit from the intake end.

Briefly this invention comprises a portable recirculating device for heated air together with controls to provide an appropriate output.

More specifically and referring to the drawings, the heating unit is supplied with heat by a heater of the type described in applicant's U.S. Pat. No. 5,819,724 as noted above. The heating unit is mounted on a pair of wheels 10 supporting the entire device and making it readily moveable from place to place wherever needed. A tongue 11 may be used to allow towing and placement of the unit.

Customarily, the unit comprising a housing 12 within which is located an engine which drives a heat generator of the type described in applicant's patent noted above and which may also drive a fan adapted to blow air through the unit and out through nozzles 13 at the exit end of the housing 12. The entire interior of the device as well as the housing 12 itself are customary installations, and therefore none of the details are shown. The usual heating unit contains the engine, heat generator and often a fan although the radiator fan of the engine may displace any separate fans.

Normally the air is taken into the housing 12 at the end opposite the nozzles 13 through an open grill 15. From the grill, the air flows through the housing 12 over the engine and through its radiator. If an auxiliary fan is used, the air may be drawn through the fan and impelled to the exit nozzle 13. The engine is used to drive the heat generator which normally heats oil which then is circulated through tubes in a heat exchanging coil near the exit thus providing heated air to be expelled through nozzle 13. One side may be hinged near its top edge as to provide access to the interior. This structure is conventional and is not shown in detail for that reason.

The problem solved by this invention arises chiefly in very cold weather when the intake air is so cold that the rise in temperature caused by the system is inadequate to provide the desired heating. To sense that inadequacy, a sensor 18 is positioned in the general area of the heat exchanger or its exit. This sensor measures the temperature of air coming out of the heat exchange and then controls the recirculating mechanism which forms the principal structure of the embodiment of the invention. The control system includes a line 19 running from the sensor 18 to a thermostat 20 on a control panel 21 in the interior of the housing 12. The thermostat then causes a motorized control device 28 to control the inlet as described below.

Figure 4:
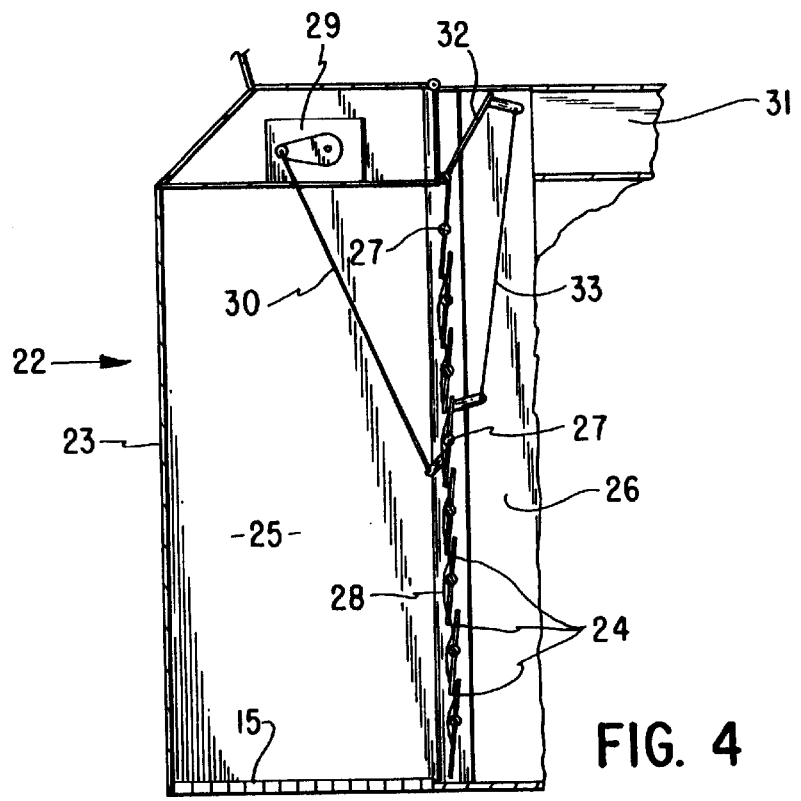
FIG. 4 is a partial sectional view of the intake end of the unit, with the recirculating shutter closed.
Figure 5:
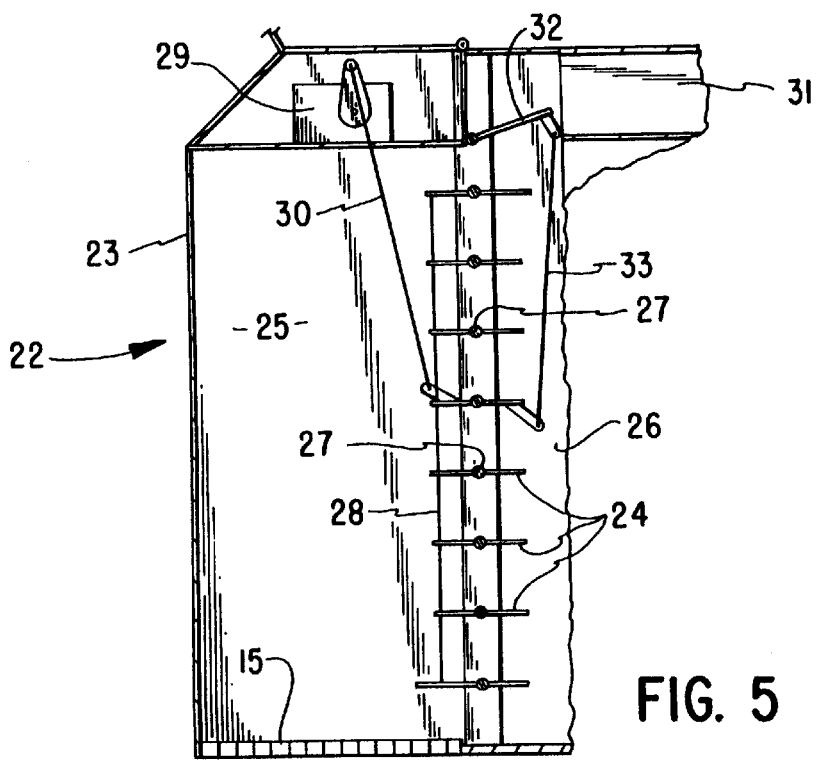
FIG. 5 is a view similar to claim 4 with the shutter opened

That principal structure is placed at the entry end of the device. It consists of a chamber 22 enclosed by walls 23 (FIGS. 4 and 5). The bottom of the chamber is open and guarded by the inlet grill 15 through which the ambient air is pulled into the chamber 22.

A bank of shutters 24 divides the chamber 22 into an inlet chamber 25 and a recirculation chamber 26. In normal operation, the air enters through the grill 15 into the inlet chamber 25, passes through the open shutter 24 shown in FIG. 5 and thence runs into the housing 12 and out of the nozzles 13.

In the preferred embodiment, the shutters 24 include a series of vanes pivoted on axles 27 and linked together by links 28. Thus the shutters can assume positions ranging from closed as shown in FIG. 4 to fully open as shown in FIG. 5. It will be obvious to those skilled in the art that other forms of shutters could be used. As an example, a pair of plates having openings which could be either matched in an open position or blocked in a closed position could be used. Other types of shutters may also be considered for a similar installation.

When the ambient air is very cold, the sensor 18 activates a powered control device 29 which may be a small motor, a solenoid or similar device to move a control rod 30 to move the shutters 24 to or toward the closed position (FIG. 4).

The recirculation occurs because the housing 12 is constructed with a duct 31 above the engine compartment. This duct leads from the exit end of the housing 12 back to the recirculation chamber 26 from which it can be recirculated through the engine compartment and out through the nozzle 13.

The sensor 18 and the control device 29 control the flow of air though the engine compartment by adjusting the shutters 24 by means of the rod 30. The volume of recirculated air flow is controlled by a closing vane 32. A rod 33 leads from the back of shutters 24 to the vane 32 so that when the shutters open, the vane 32 is closed. When the shutters are closed as in FIG. 4, the vane 32 will then be open.

Thus in normal use (FIG. 5) when the air at the outlet is sufficiently warmed, the shutters 24 are opened and the air flows freely through the grill 15 and into the housing to be continually warmed and blown out through the nozzle 13. The vane 32 is substantially closed so that no air flows through the duct 31 and all the heated air flows straight through the system.

If the air entering the grill is very cold and the heat exchanger in the compartment 12 is inadequate to raise the temperature to an acceptable figure, the sensor 18 activates the control device 29 to move the shutters 24 toward the closed position. This also raises the vane 32 to open the duct 31 into the recirculation chamber 26 so as to allow air to recirculate from the discharge end of the housing to be additionally heated by passing through the heat exchanger another time. Eventually, the air is properly tempered so that the sensor 18 and control device 29 reads a correct balance and the entire unit is conditioned to deliver air from the nozzles 13 at a satisfactory temperature.

It is therefore apparent that by the use of the recirculating function and its controls that a more satisfactory heater can be made available.

What is claimed is:

1. For use with a portable warmed air heater including an engine, a heat generator, a heat exchanger to transfer from said exchanger to said air and means for moving said air; a housing enclosing said engine, heat generator and heat exchanger, said housing having an intake end and an exit end, a duct formed in said housing leading from said exit end to said intake end to allow air to be recirculated from said exit end to said intake end, a chamber formed in said intake end of said housing, intake means formed in said chamber for allowing ambient air to enter said chamber, control means in said chamber for controlling the proportions between the shares of ambient inlet air and of recirculated inlet air and a sensor device at said exit end for sensing temperature of air leaving said housing, said sensor device being operably connected to said control means to adjust said control means for adjusting said shares to provide a satisfactory exit air temperature.

2. The housing of claim 1 in which said control means comprises a shutter means for dividing said chamber into an inlet chamber and a recirculation chamber and a powered control mechanism engaged with said shutter means to move said shutter means from an open position to a closed position, said sensor being operably connected to said power control mechanism.

3. The housing of claim 2 in which a recirculation control device is located at the intake end of said duct to control the flow of air being recirculated through said duct.

4. The housing of claim 3 in which said recirculation control device is controlled in concert with the positions of said shutter means.

5. The housing of claim 2 in which said powered control mechanism includes a motorized device and a bar from said motorized device engaged with at least one part of said shutters.

6. The housing of claim 2 in which said shutter means comprises a series of shutter vanes adapted to be tilted from the closed position in which said shutter vanes lie adjacent each other to an open position in which said shutter vanes are nearly parallel.

7. The housing of claim 6 in which a bar extends from said powered control mechanism to at least one of said shutter vanes for transmitting motion from said control mechanism to said shutter vanes.

8. The housing of claim 7 in which a recirculation control device is located at the intake end of said duct to control the flow of recirculated air through said duct, means engaged between said recirculation control device and said powered control mechanism for controlling the recirculated air flow through said duct.

9. The housing of claim 8 in which said means for controlling the recirculated air flow includes bar means engaged between said shutter vanes and said recirculation control device.

10. The housing of claim 8 in which said recirculation control device comprises a control vane tiltably mounted at the intake end of said duct.

* * * * *